(12) United States Patent
Ray et al.

(10) Patent No.: US 11,480,530 B2
(45) Date of Patent: Oct. 25, 2022

(54) OPTICAL DETECTION OF FOREIGN OBJECT DEBRIS INGESTED BY AIRCRAFT ENGINE

(71) Applicant: Rosemount Aerospace Inc., Burnsville, MN (US)

(72) Inventors: Mark Ray, Burnsville, MN (US); Darren G. Jackson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 42 days.

(21) Appl. No.: 17/225,985

(22) Filed: Apr. 8, 2021

(65) Prior Publication Data
US 2021/0325315 A1    Oct. 21, 2021

Related U.S. Application Data

(60) Provisional application No. 63/010,445, filed on Apr. 15, 2020.

(51) Int. Cl.
*G01N 21/00* (2006.01)
*G01N 21/94* (2006.01)
*F01D 21/00* (2006.01)

(52) U.S. Cl.
CPC .......... *G01N 21/94* (2013.01); *F01D 21/003* (2013.01); *G01N 2201/06113* (2013.01)

(58) Field of Classification Search
CPC ......... G01N 21/94; G01N 2201/06113; G01N 21/954; F01D 21/003; F01D 17/02;
(Continued)

(56) References Cited

U.S. PATENT DOCUMENTS 6,499,350 B1    12/2002  Board et al.
9,926,937 B2    3/2018   Tourin et al.
(Continued)

FOREIGN PATENT DOCUMENTS

EP    3112799 A1    1/2017
EP    3399338 A1    11/2018
GB    2511344 A     9/2014

OTHER PUBLICATIONS

Partial Extended European Search Report dated Sep. 13, 2021, received for corresponding European Application No. 21168420.4, 17 pages.
(Continued)

*Primary Examiner* — Md M Rahman
(74) *Attorney, Agent, or Firm* — Kinney & Lange, P.A.

(57) ABSTRACT

Apparatus and associated methods relate to a system for detecting foreign object debris ingested into an aircraft engine. The system detects such foreign object debris by projecting a beam of light over an inlet of the aircraft engine. When foreign object debris is ingested into the aircraft engine, it intercepts the beam of light and scatters a back-scattered portion of the intercepted beam of light. An optical detector is configured to detect the back-scattered portion of the intercepted beam of light. A processor is configured to determine whether foreign object debris is ingested by the aircraft engine based on a comparison of a threshold value with a signal indicative of the back-scattered portion generated by the optical detector.

19 Claims, 8 Drawing Sheets

(58) Field of Classification Search
CPC ........... F05D 2270/8041; G01S 7/4802; G01S 17/04; G01S 17/10; G01S 17/36; G01S 17/86; G01S 17/88
USPC ...................................................... 356/237.3
See application file for complete search history.

(56) References Cited

U.S. PATENT DOCUMENTS

| | | | |
|---|---|---|---|
| 2011/0058167 A1* | 3/2011 | Knox | H04N 7/18 356/338 |
| 2014/0375770 A1 | 12/2014 | Habel et al. | |
| 2015/0253429 A1 | 9/2015 | Dorrington et al. | |
| 2017/0276588 A1* | 9/2017 | Knox | G08B 29/185 |
| 2019/0354772 A1 | 11/2019 | Tasli et al. | |

OTHER PUBLICATIONS

Extended European Search Report dated Jan. 28, 2022, received for corresponding European Application No. 21168420.4, pp. 18.

* cited by examiner

OPTICAL DETECTION OF FOREIGN OBJECT DEBRIS INGESTED BY AIRCRAFT ENGINE

BACKGROUND

Foreign Object Debris (FOD) can cause severe damage to gas turbine aircraft engines if ingested therein Eliminating FOD on the taxiways and runways of an airport can help to prevent ingestion of FOD such as metal tools and fasteners that can cause damage to aircraft engines. Even if FOD were to be entirely eliminated from these taxiways and runways, however, there would still remain a non-zero possibility of FOD ingestion into aircraft engines from other sources of FOD. Even nature provides for such sources of FOD, which include, for example, bird strikes, hail, and volcanic ash.

Current methods for detecting ingestion of FOD into aircraft engines rely on the FOD being metallic, yet FOD can include non-metallic objects consisting of a wide variety of non-metallic materials. Moreover, these current FOD detection systems that sense only metallic objects have reported only a thirty-percent detection rate. Therefore, most of the FOD that is ingested into an aircraft engine goes undetected.

If the aircraft engine is suspected of having ingested damaging FOD, inspection of the aircraft engine's internal parts is often required. Such internal inspection can be time consuming and expensive, as well as unnecessary if, for example, the aircraft engine did not ingest FOD. A method of reliably monitoring the ingestion of FOD of all types into an aircraft engine could eliminate such unnecessary inspections.

SUMMARY

Apparatus and associated methods relate to a system for detecting foreign object debris ingested by an aircraft engine. The system includes an optical projector configured to project a beam of light across an inlet of the aircraft engine. The system includes an optical detector aligned with the optical projector so as to detect a back-scattered portion of the beam of light scattered by objects passing therethrough. The system includes a processor configured to determine whether foreign object debris enters the aircraft engine inlet based on a comparison of a threshold value with a signal indicative of the back-scattered portion generated by the optical detector.

Some embodiments relate to a system for detecting foreign object debris ingested by an aircraft engine. The system includes a plurality of foreign object detectors distributed about an inlet of an aircraft engine. Each of the plurality of foreign object detectors includes an optical projector configured to project a beam of light across the inlet of the aircraft engine. Each of the plurality of foreign object detectors also includes an optical detector aligned with the optical projector so as to detect a back-scattered portion of the beam of light scattered by objects passing therethrough. The system includes a processor configured to determine whether foreign object debris enters the aircraft engine inlet based on a comparison of a threshold value with a signal indicative of the back-scattered portion generated by at least one of the plurality of optical detectors.

Some embodiments relate to a method for detecting foreign object debris ingested by an aircraft engine. The method includes projecting, via an optical projector, a beam of light across an inlet of the aircraft engine. The method includes detecting, via an optical detector aligned with the optical projector, a back-scattered portion of the beam of light scattered by objects passing therethrough. The method also includes determining, via a processor, whether foreign object debris enters the aircraft engine inlet based on a comparison of a threshold value with a signal indicative of the back-scattered portion generated by the optical detector.

DETAILED DESCRIPTION

Apparatus and associated methods relate to a system for detecting foreign object debris ingested into an aircraft engine. The system detects such foreign object debris by projecting a beam of light over an inlet of the aircraft engine. When foreign object debris is ingested into the aircraft engine, it intercepts the beam of light and scatters a back-scattered portion of the intercepted beam of light. An optical detector is configured to detect the back-scattered portion of the intercepted beam of light. A processor is configured to determine whether foreign object debris is ingested by the aircraft engine based on a comparison of a threshold value with a signal indicative of the back-scattered portion generated by the optical detector.

Figure 1:
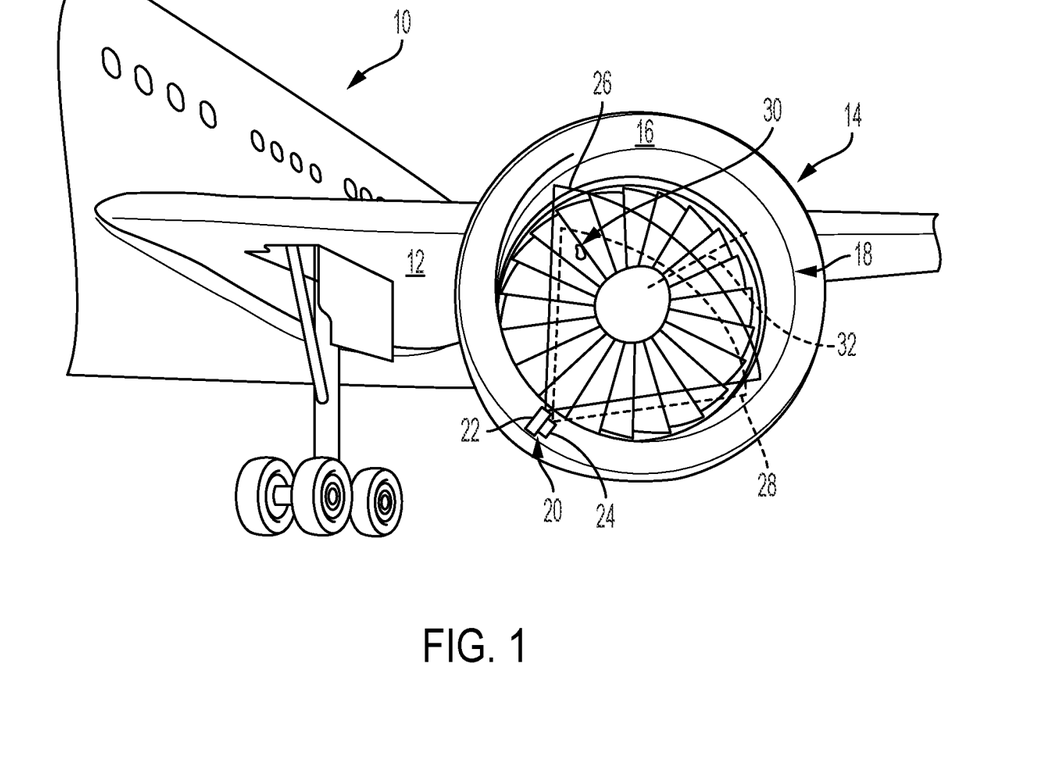
FIG. 1 is a perspective view of an aircraft equipped with a system for detecting ingestion of Foreign Object Debris (FOD).

FIG. 1 is a perspective view of an aircraft equipped with a system for detecting ingestion of Foreign Object Debris (FOD). In FIG. 1, aircraft 10 has wing 12, from which aircraft engine 14 is supported. Aircraft engine 14 has inlet cowl 16 surrounding inlet 18 of aircraft engine 14. Foreign-Object-Debris (FOD) detection system 20 is mounted to inlet cowl 16. FOD detection system 20 includes optical projector 22 and optical detector 24. Optical projector 22 is shown projecting a beam of light over a projection field of view 26 across inlet 18. Optical detector 24 is configured to detect a portion of the projected beam of light scattered by foreign object 30 intercepting the beam of light projected by optical projector 22. Optical detector 24 has detection field of view 28 that intersects with projection field of view 26 of optical projector 22, such that optical detector 24 does not detect unscattered or forward-scattered portions of beam of light projected by optical projector 22. When optical detector 24 detects a back-scattered portion of the projected beam of light, FOD detection system 20 can determine that foreign object 30 has been ingested into aircraft engine 14.

Various embodiments of FOD detection system 20 can implement various methods of projecting a beam of light, such as the beam of light projected over the projection field of view 26, across inlet 18. In some embodiments, for example, optical projector 22 can include a laser configured to project a beam of light collimated in both directions transverse to a direction of projection. In such an embodiment, optical projector 22 can scan the beam of light across inlet 18 in directions transverse to longitudinal axis 32 of aircraft engine 14, so as to scan within a plane orthogonal to longitudinal axis 32. In such an embodiment, the beam can be scanned throughout projection field of view 26. In other embodiments, a laser beam can be collimated in a direction parallel to longitudinal axis 32 of the aircraft engine 14 and be diverged in a direction orthogonal to the longitudinal axis, so as to form a planar beam of light with projection field of view 26.

In some embodiments, the projection and detection fields of view 26 and 28 of optical projector 22 and optical detector 24, respectively, can be substantially coextensive. FOD detection system 20 can be designed in various manners so as to detect foreign object injected into aircraft engine 14, but not detect (or not report) foreign objects nearby but not ingested into aircraft engine 14. In some embodiments, optical projector 22 is configured to project a beam of light over projection field of view 26 and onto an optically-absorptive surface (e.g., onto a black interior surface of inlet cowl 16) so as to minimize any optical signal reflected thereby and detected by optical detector 24. By so directing the projected beam of light, objects outside of inlet 18 cannot intercept the projected beam of light and therefore cannot scatter a portion of the projected beam of light. Such a configuration can reduce detection of foreign objects that are not ingested by aircraft engine 14.

In other embodiments, optical projector 22 can be configured to project a diverging beam of light past inlet cowl 16, resulting in a concomitant attenuation of the diverging beam of light with increasing distance of travel. Any portion of such an attenuated beam of light scattered by any foreign objects outside of inlet 18 will be further attenuated because of the increased distance of travel of the return path, thereby reducing detection thereof. In some embodiments, the projection and detection fields of view 26 and 28 of optical projector 22 and optical detector 24, respectively, are aligned so as to have a limited or maximum range of intersection, beyond which any optical signals scattered by foreign objects intercepting projection field of view 26 will be outside of detection field of view 28 and therefore will not be detectable by optical detector 24. Detection field of view 28, for example, can be canted with respect to projection field of view 26 so as to limit the range of intersection therebetween. Foreign objects that are not ingested into aircraft engine 14 but are detected by optical detector 24 also can be determined to have not been ingested by calculation of location of such foreign objects as will be shown below.

In some embodiments, in addition to detecting foreign objects ingested by aircraft engine 14, FOD detection system 20 can also determine various metrics of such ingested foreign objects, such as foreign object 30. FOD detection system 20 can determine these various metrics of foreign object 30 based on signals generated by optical detector 24 in response to detecting back-scattered portion 28 scattered by foreign object 30 intercepting the beam of light projected by optical projector 22. For example, in some embodiments, FOD detection system 20 can determine one or more of the following FOD metrics: range and/or location of foreign object 30 at which foreign object 30 intercepts the projected beam of light, and one or more dimension of foreign object 30.

In some embodiments, optical projector 22 can be a pulsed optical projector configured to project a series of pulsed planar beams of light over projection field of view 26. Range of foreign object 30 can be determined, for example, by measuring a time duration from a projection time, at which time a pulsed planar beam of light 26 is projected from optical projector 22, to a detection time, at which time a back-scattered portion of the pulsed planar beam of light scattered by foreign object 30 is detected by optical detector 24. The time difference between projection and detection times is indicative of a range of foreign object 30 from optical projector 22 and optical detector 24.

In other embodiments, optical projector 22 can be a continuous-wave optical projector configured to project a continuous beam of light collimated in a planar fashion. Such a continuous beam of light can be continuously projected over projection field of view 26. The continuous beam of light can be modulated at a modulation frequency. Optical detector 24 can be configured to a detect back-scattered portion of modulated planar beam of light scattered by foreign object 30. The detected portion of the planar beam of light will also be modulated, but with a phase delay $\Delta\theta$ from the projected beam of planar light. This phase delay $\Delta\theta$ is indicative of range of foreign object 30 from optical projector 22 and optical detector 24.

In still other embodiments, optical projector 22 can be a continuous-wave optical projector configured to project a beam of light collimated in a directions orthogonal to the direction of projection. Such a continuous beam of light 26 can be modulated at a modulation frequency and then scanned over projection field of view 26. Optical detector 24 can be configured to detect back-scattered portion 28 of modulated and scanned beam of light scattered by foreign object 30. The detected portion of modulated and scanned beam of light 26 will indicate a modulation that is phase delayed $\Delta\theta$ from the projected beam of light and a pulse duration $\Delta T$ during which duration the scanned beam of light is incident upon foreign object 30. The phase delay $\Delta\theta$ is indicative of range of foreign object 30 from optical projector 22 and optical detector 24. The time duration $\Delta T$ is indicative of a transverse dimension of foreign object 30.

In some embodiments, FOD detection system 20 can capture images of foreign object 30, and perhaps store such captured images for either real-time analysis or later analysis. In some embodiments, optical detector 24 can include a linear array of optical detectors, each with a detection field of view spanning a corresponding arc within or portion of detection field of view 28 of the entire linear array. Direction from which a back-scattered portion of the projected beam of light scattered by foreign object 30 can be determined based on which element(s) of the linear array optical detectors detected the back-scattered portion.

In some embodiments, FOD detection system 20 can generate a signal indicative of FOD ingestion in response to detecting foreign object 30. In some embodiments, FOD detection system 20 can also generate one or more signals indicative of range, location, size, number, concentration, type, etc. of detected foreign object 30, based on one or more signals generated by optical detector 24. These and various other signals (e.g., signals provided by aircraft 10 or engine 14, etc.) can be communicated to a health monitoring system and/or stored for later analysis. These various other signals that can be communicated and/or stored include airspeed, altitude, air pressure, angle of attack, angle of side-slip, aircraft engine speed, etc. Such information (e.g., the signals generated by FOD detection system 20 and/or various other related signals) can then be used to determine actions and/or notifications, such as aircraft engine shutdown, maintenance needs, etc.

In some embodiments, FOD detection system 20 can determine metrics of the atmosphere ingested into aircraft engine 14. For example, optical projector 22 can project a polarized beam of light over a projection field of view 26 across inlet 18. This projected polarized beam of light can be polarized in a first polarization state (e.g., right-hand circularly polarized or linearly polarized, etc.) Because optical detector 24 is be configured to detect a portion of the projected beam of light scattered by foreign object 30 intercepting the beam of light projected by optical projector 22, optical detector 24 is also configured to detect a portion of the projected beam of light back-scattered by the atmosphere ingested into aircraft engine 14. Optical detector 24 can be configured to detect back-scattered light of both the first polarization state and a second polarization state orthogonal to the first polarization state.

These polarized portions of back-scattered light can be used to determine various metrics of the atmosphere ingested into aircraft engine 14. Furthermore, multiple wavelengths of light can be projected and detected to provide further measurable data for determining more or better metrics of the cloud atmosphere. For example, ice crystals can be differentiated from water droplets based on the relative amplitudes of orthogonal polarities of light back-scattered by the atmosphere. Smoke particles can be differentiated from both ice particles and water droplets using two difference wavelengths of light and three different scattering angles, for example.

Figure 2A:
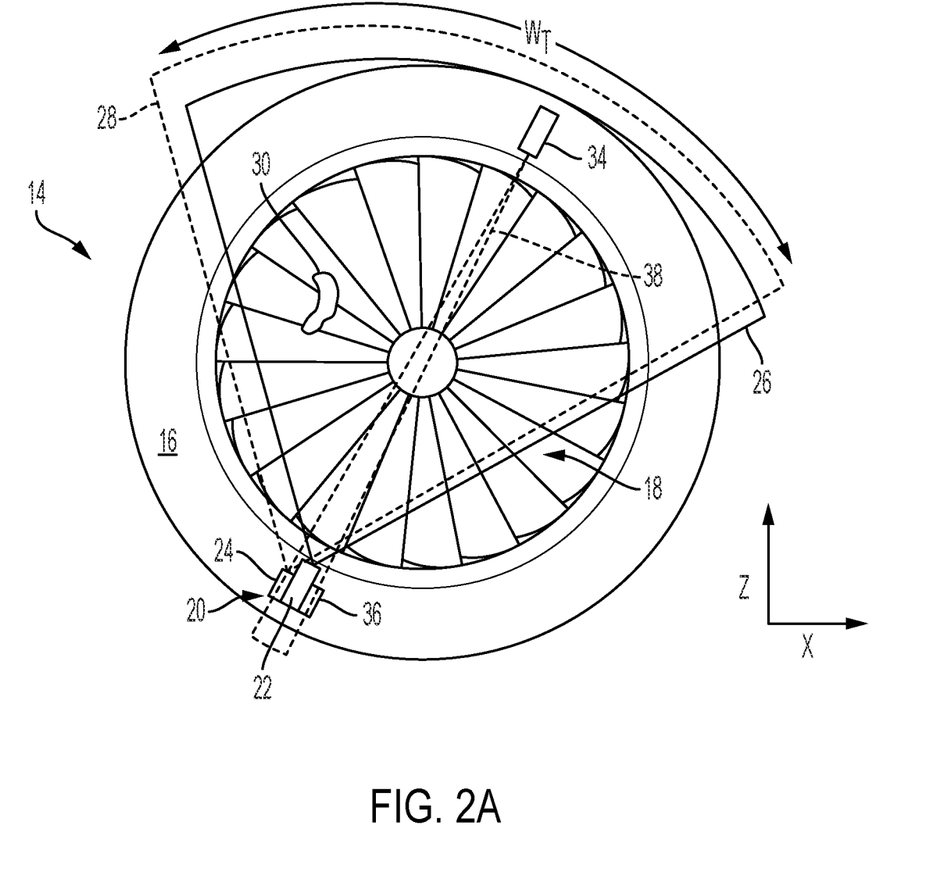
FIGS. 2A and 2B are front and side elevation views, respectively, of a system for detecting aircraft engine ingestion of foreign object debris.
Figure 2B:
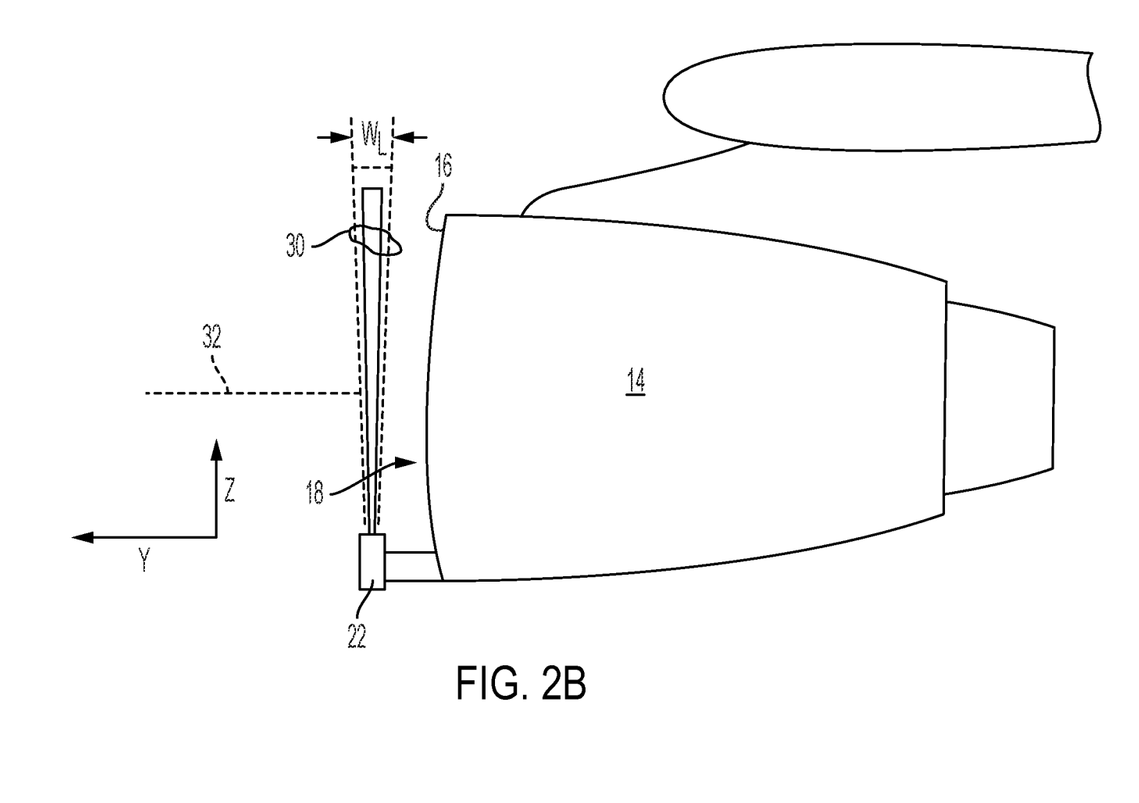

FIGS. 2A and 2B are front and side elevation views, respectively, of a system for detecting aircraft engine ingestion of foreign object debris. In FIGS. 2A and 2B, aircraft engine 14 is equipped with FOD detection system 20 mounted to inlet cowl 16 of aircraft engine 14. FOD system includes optical projector 22, first and second optical detectors 24 and 34, and camera 36. Optical projector 22 is configured to project a planar beam of light across inlet 18 of aircraft engine 14, while first and second optical detectors 24 and 34 are configured to detect scattered and unscattered or forward-scattered portions, respectively of the projected optical beam. As such, first optical detector 24 is aligned with and is adjacent to optical projector 22 so as to not detect unscattered or forward-scattered portions of the projected optical beam, and second optical detector 34 is located on inlet cowl 18 of aircraft engine 14 across from optical projector 22 so as to detect unscattered or forward-scattered portions of the projected optical beam.

Optical projector 22 is shown projecting the planar beam of light over projection field of view 26 across inlet 18 of aircraft engine 14. The planar beam of light is projected in directions substantially orthogonal to longitudinal axis 32 of aircraft engine 14. The planar beam of light diverges from optical projector 22 so as to span most of inlet 18 of aircraft engine 14. The planar beam of light diverges from optical projector 22 in a transverse direction (e.g., in the x and z directions as labeled in FIGS. 2A and 2B) orthogonal to longitudinal axis 32 (i.e., the z direction as labeled in FIGS. 2A and 2B) to form a planar beam (i.e., a beam that is collimated so as to diverge only a small amount in the longitudinal direction, while diverging in transverse directions orthogonal to longitudinal axis 32), so as to substantially span inlet 18 of aircraft engine 14. First optical detector 24 is configured to detect light scattered by foreign object 30 intercepting the projected planar beam of light. Second optical detector 34 is configured to detect light not scattered by any foreign object (except those in its narrow field of view), so as to determine an extinction coefficient of the atmosphere ingested by aircraft engine 14.

In FIG. 2B, optical projector 22 is projecting the planar beam of light across inlet 18 of aircraft engine 14. FIG. 2B depicts the same scenario depicting in FIG. 2A but from a side elevation perspective instead of the front elevation perspective shown in FIG. 2A. Optical projector 22 is projecting the planar beam of light in directions substantially orthogonal to longitudinal axis 32 of aircraft engine 14. The planar beam of light is collimated in the longitudinal direction so as to diverge only a small amount in longitudinal directions (i.e., the y-z planes). In the FIG. 2B depiction, the planar beam of light is directed across or in front of inlet cowl 16 and therefore is not incident upon or absorbed by a surface of inlet cowl 16. First optical detector 24 is configured to detect a back-scattered portion of the projected planar beam of light scattered by foreign object 30 intercepting the projected planar beam of light. Second optical detector 34 is configured to detect light not scattered by any foreign objects, so as to determine an extinction coefficient of the atmosphere ingested by aircraft engine 14.

The planar beam of light is incident upon and scattered by (e.g., reflected by) any foreign object, such as foreign object 30, that falls both within a transverse beam width $w_T$ and within longitudinal beam width $w_L$ of the planar beam of light. Because the planar beam of light substantially spans inlet 18 of aircraft engine 14, when foreign object 30 is ingested into aircraft engine 14, foreign object 30 will traverse the planar beam of light and scatter (e.g., reflect) a back-scattered portion of planar beam of light as it intercepts (i.e., passes through) the projected planar beam of light. First optical detector 24 is aligned with optical projector 22 so as to detect the back-scattered portion but not the unscattered or forward-scattered portions of planar beam of light 26. In the depicted embodiment, first optical detector 24 is adjacent to and directionally aligned with optical projector 22. In other embodiments, first optical detector 24 and optical projector can be located at different locations about inlet 18 of engine 14, and therefore need not be so aligned. Directional alignment of optical projector 22 and first optical detector 24 in the FIGS. 2A-2B embodiment means that optical projector 22 and first optical detector 24 are aligned substantially parallel to one another such that their fields of view are substantially the same (e.g., substantially coextensive). Projection field of view 26 of optical projector 22 and the detection field of view 28 of first optical detector 24 intercept one another in a substantially complete fashion (i.e., these fields of view are substantially coextensive).

Second optical detector 34 is positioned on an opposite side of inlet cowl 16 than are positioned optical projector 22 and first optical detector 24. Second optical detector 34 is aligned with optical projector 22 so as to detect unscattered or forward-scattered portions of planar beam of light 26. In the depicted embodiment, second optical detector 34 is opposite to and directionally aligned with optical projector 22. Directional alignment of optical projector 22 and second optical detector 34 in the FIGS. 2A-2B embodiment means that optical projector 22 and second optical detector 34 are aligned substantially anti-parallel such that detection field of view 38 of second optical detector 34 includes optical projector 22. The projection field of view of optical projector 22 and detection field of view 38 of second optical detector 34 intercept one another such that detection field of view 38 is aligned to receive a projected beam of light directed thereto by optical projector 22 when not obstructed by any foreign object.

In some embodiments, one or more cameras, such as camera 36 is aligned so as to capture images of any foreign objects, such as foreign object 30, ingested into aircraft engine 14. In various embodiments, optical camera 36 can be operated in various manners. For example, optical camera 36 can be configured to continuously capture images of a scene across inlet 18 of aircraft engine 14. In such embodiments, all of the images can be stored for later retrieval or only those images that coincide with detection of a foreign object by FOD detection system 20. In some embodiments, camera 36 can be configured to capture images of the scene in response to detection of a foreign object intercepting the projected beam of light. In some embodiments, FOD detection system 20 can determine object size based, at least in part, on images captured by camera 36.

Figure 3A:
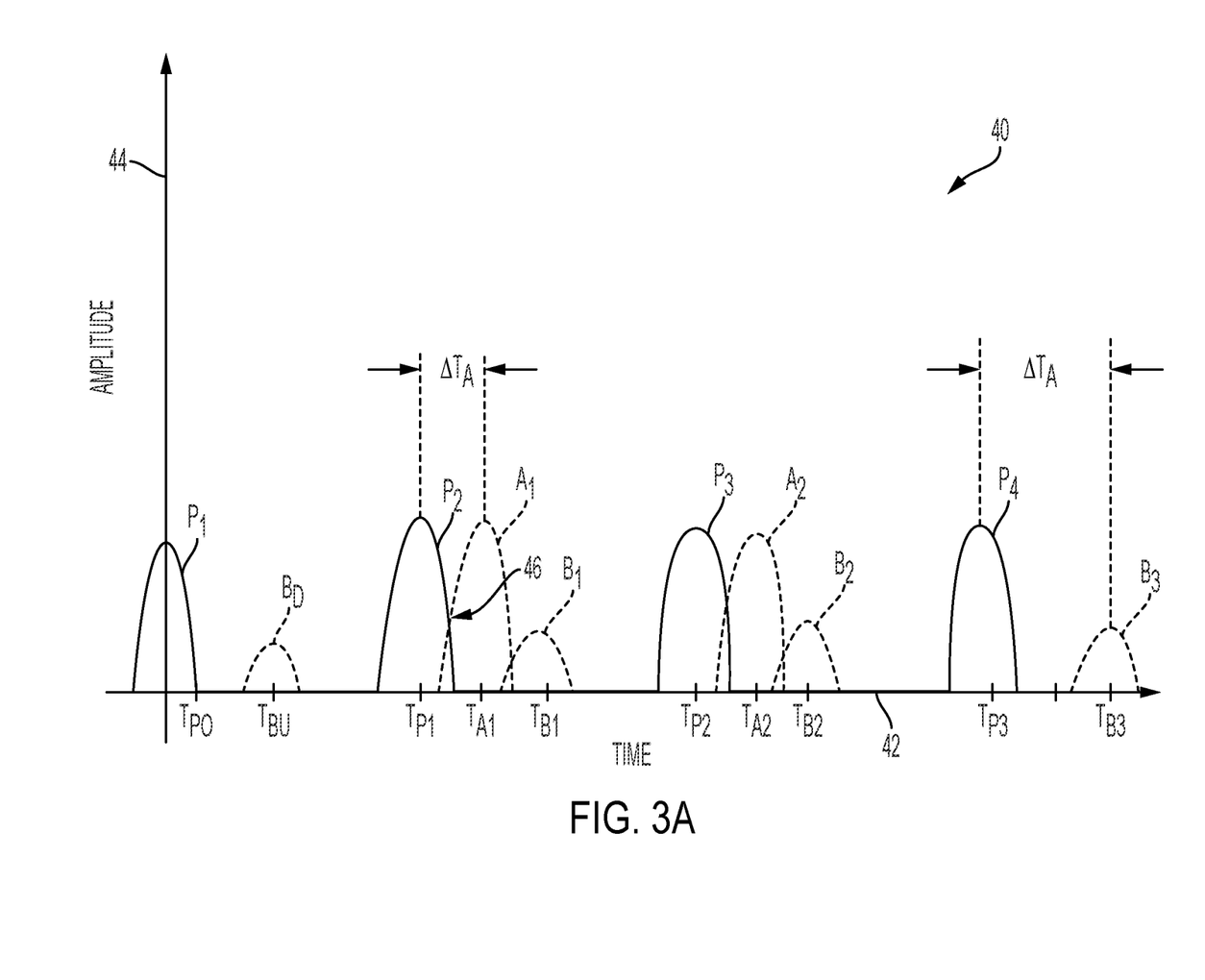
FIGS. 3A and 3B are graphs of an optical signal projected across an aircraft engine inlet and an optical signal reflected by foreign object debris as detected by an optical detector.
Figure 3B:
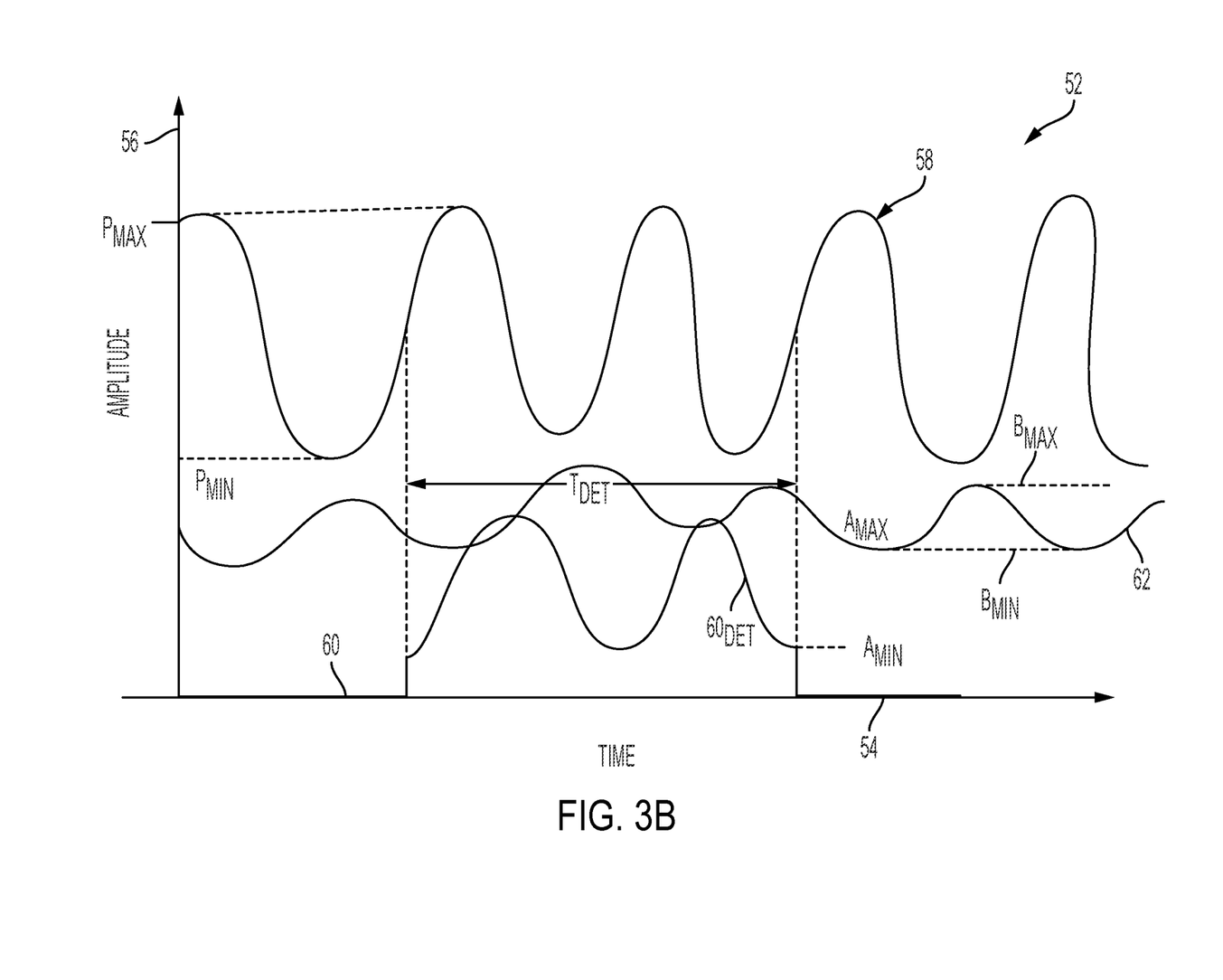

FIGS. 3A and 3B are graphs of an optical signal projected across an aircraft engine inlet and an optical signal reflected by foreign object debris as detected by an optical detector. In FIG. 3A, graph 40 includes horizontal axis 42, vertical axis 44, and amplitude/time relations 46, 48 and 50. Horizontal axis 42 is indicative of time, and vertical axis 44 is indicative of amplitude of light. Amplitude/time relation 46 is indicative of amplitude of a projected beam of light, such as planar beam of light projected from light projector 22. Amplitude/time relation 46 is indicative of a series of pulses of light collimated in a planar fashion as projected from a pulsed light projector as described above. Amplitude/time relation 46 depicts projected pulses $P_0$, $P_1$, $P_2$, and $P_3$ projected at times $T_{P0}$, $T_{P1}$, $T_{P2}$, and $T_{P3}$, respectively.

Amplitude/time relation 48 corresponds to a signal generated by optical detector 24. Amplitude/time relation 48 is indicative of a back-scattered portion of the projected beam of light, such as portion scattered by foreign object 30 (depicted in FIGS. 2A and 2B). Amplitude/time duration 48 depicts detected pulse $A_1$ and $A_2$ detected at time $T_{A1}$ and $T_{A2}$, respectively. Each of detected pulses $A_1$ and $A_2$ are delayed in time by $\Delta T_A$ from projected pulses $P_2$ and $P_3$, respectively. Time delay $\Delta T_A$ corresponds to the time for the planar beam of light to project from optical projector 22 to foreign object 30 and then scatter to optical detector 24. Range $R_{FOD}$ of foreign object 30 to optical projector 22 and optical detector 24, based on time delay $\Delta T_A$:

$$R_{FOD} = \frac{\Delta T_A \cdot c}{2}, \quad (1)$$

where c is the speed of light, and optical projector 22 and optical detector 24 are located adjacent to one another. Such a calculated range $R_{FOD}$ from optical projector/detector 22/24 can be used in conjunction with a second calculated range from a second optical detector/projector pair to determine a location within a detection plane (i.e., a volume of space defined by an intersection of the projection and detection fields of view), through which foreign object 30 traverses. Amplitude/time relation 48 indicates no pulses detected corresponding to projected pulses $P_0$ and $P_3$. This indicates that foreign object 30 traversed the detection plane only during the times that pulses $P_2$ and $P_3$ where projected in a planar fashion across inlet 18. In this way, amplitude/time relation 48 can be used to determine the time at which foreign object 30 is ingested into aircraft engine 14, as well as a range and/or location within the detection plane where such ingestion occurred.

Amplitude/time relation 50 is indicative of unscattered or forward-scattered portions of the planar beam of light projected across inlet 18 (as depicted in FIGS. 2A and 2B). Amplitude/time duration 50 depicts first detected pulses $B_0$, $B_1$, $B_2$, and $B_3$ detected at time $T_{B0}$, $T_{B1}$, $T_{B2}$, and $T_{B3}$, respectively. Each of detected pulses $B_0$, $B_1$, $B_2$, and $B_3$ are delayed in time by $\Delta T_B$ from projected pulses $P_0$, $P_1$, $P_2$, and $P_3$, respectively. Time delay $\Delta T_B$ corresponds to the time for the planar beam of light to project from optical projector 22, across inlet 18 of aircraft engine 14 and then be detected by optical detector 34. Amplitude of detected pulses $B_1$, $B_2$, $B_3$, and $B_4$ can be indicative of optical extinction coefficient corresponding to attenuation of planar beam of light due to atmospheric conditions, such as water particles, ash, or other optical attenuating conditions. The amplitudes are also indicative of the reflectance of foreign object 30, which is an unknown. Such optical extinction coefficient can be used to determine a metric corresponding to accumulated wear of aircraft engine components due to ingestion of the particulates causing the optical attenuation.

The information depicted graph 40 shown in FIG. 3A can be used to derive certain operating conditions of FOD detection system 20. A maximum pulse frequency of the projected planar beam of light can be determined using the greatest radial distance to be measured (e.g., the radius of inlet 18 or perhaps something larger than this). A minimum pulse frequency can be determined from the transmit time of a foreign object through the detection plane (e.g., the intersection of the projection and detection fields of view). For the passage of a 2-mm longitudinally-thick object through the detection plane at a speed of Mach 1, the transit time is at least 5.8 µs. (The longitudinal dimension $w_L$ of the detection plane will increase the transit time beyond this minimum value.) For the reception of at least one pulse projected by optical projector 22, the pulse frequency should be 170 kHz or greater. This minimum pulse frequency is much less than the upper limit of pulse frequency imposed by the maximum radial distance, such that there is no range ambiguity. For an aircraft engine inlet with a one-meter maximum detection range, the upper limit on the pulse frequency is 150 MHz. Hence, phase detection using pulse frequencies of tens of MHz enables the detection of multiple tens of pulses for small, fast-moving foreign objects as they pass through the detection plane across inlet 16 of aircraft engine 14. The resulting spatial resolution of the range measurement can be as little as a few mm.

In FIG. 3B, graph 52 includes horizontal axis 55, vertical axis 56, and amplitude/time relations 58, 60 and 62. Horizontal axis 54 is indicative of time, and vertical axis 56 is indicative of amplitude of light. Amplitude/time relation 58 is indicative of amplitude of a projected beam of light, such as a planar beam of light projected from light projector 22. Amplitude/time relation 58 is indicative of a continuous beam of light collimated in a planar fashion projected from a continuous-wave light projector as described above. Amplitude/time relation 58 depicts an amplitude that is modulated between a maximum amplitude $P_{MAX}$ and a minimum amplitude $P_{MIN}$.

Amplitude/time relation 60 is indicative of a back-scattered portion of the projected modulated beam of light scattered by foreign object 30 (depicted in FIGS. 2A and 2B). Amplitude/time duration 60 has a FOD detected portion $60_{DET}$ that has a time duration $T_{DET}$ in which back-scattered portion 28 is detected by optical detector 24. During time duration $T_{DET}$, FOD detected portion $60_{DET}$ is indicative of foreign object 30 traversing the detection plane. FOD detected portion $60_{DET}$ depicts a detected waveform having an amplitude modulated between a maximum amplitude $A_{MAX}$ and a minimum amplitude $A_{MIN}$. The amplitude modulation of FOD detected portion $58A_{DET}$ is phase delayed by AOA with respect to modulated planar beam projected from optical projector 22 as indicated by amplitude/time relation 56. Phase delay $\Delta\theta$ A corresponds to the phase difference arising from a time required for the planar beam of light to project from optical projector 22 to foreign object 30 and then scatter to optical detector 24. Again, range $R_{FOD}$ of foreign object 30 to optical projector 22 and optical detector 24 can be calculated using equation (1) above and converting the phase delay 40A to a time delay $\Delta T_A$:

$$\Delta T_A = \frac{\Delta \theta_A}{2\pi f_{MOD}} \quad (2)$$

Amplitude/time relation 60 can be used to determine the time at which foreign object 30 is ingested into aircraft engine 14, as well as a range and/or location at which such ingestion occurs.

Amplitude/time relation 62 is indicative of unscattered or forward-scattered portions of the projected modulated beam of light. Amplitude/time relation 62 corresponds to the modulated beam of light as detected by optical detector 34. Amplitude-time relation 62 depicts a detected waveform having an amplitude modulated between a maximum amplitude $B_{MAX}$ and a minimum amplitude $B_{MIN}$. The amplitude modulation of the detected waveform is phase delayed by $\Delta\theta_B$ with respect to projected planar beam of light as indicated by amplitude/time relation 56. Phase delay $\Delta\theta_B$ corresponds to the phase difference arising from a time required for the planar beam of light to project from optical projector 22, across inlet 18 of aircraft engine 14 to optical detector 34. Amplitude of amplitude/time relation 62 can indicative of optical extinction coefficient corresponding to attenuation of planar beam of light due to atmospheric conditions, such as water particles, ash, or other optical attenuating conditions. Such optical extinction coefficient can be used to determine a metric corresponding to accumulated wear of aircraft engine components due to ingestion of the particulates causing the optical attenuation.

The information depicted graph 52 shown in FIG. 3B can be used to derive certain operating conditions of FOD detection system 20. A maximum modulation frequency of the projected beam of light can be determined using the greatest radial distance to be measured (e.g., 1× or 2× the radius of inlet 18). A minimum modulation frequency can be determined from the transmit time of the FOD through the detection plane (e.g., the intersection of the projection and detection fields of view). For the passage of a 2-mm thick object through the sensor plane at a speed of Mach 1, the transit time is at least 5.8 µs. (The width of the detection plane will increase the transit time beyond this minimum value.) For the reception of at least one full cycle of intensity modulation from the FOD, the modulation frequency should be 170 kHz or greater. The upper limit on the modulation frequency is 150 MHz for an aircraft engine inlet with a one-meter maximum detection range. Again, phase detection using modulation frequencies of tens of MHz (typical of modulated laser range finders) enables the reception of multiple tens of modulation cycles for small, fast-moving FOD over the face of aircraft engine inlet.

If the airspeed $V_{AIR}$ at the inlet is known, the longitudinal dimension of a detected foreign object is given by:

$$L_{FOD} = V_{AIR}\Delta t - d_L \quad (3)$$

where $\Delta t$ is the transit time of the detected foreign object, and $d_L$ is the longitudinal dimension of the detection plane at the location where the foreign object passes through it. The longitudinal dimension of the detection plane can be a function the initial longitudinal dimension $y_L$ of collimated laser beam, the laser divergence angle $\varphi$ perpendicular to the detection plane, and the radial distance R from the laser generating the detection plane. Hence, $$L_{FOD} = V_{AIR}\Delta t - (y_L + R\varphi). \quad (4)$$

Two or more different optical sensors, such as optical sensor 24, can be configured to detect foreign objects traversing the detection plane, as will be described below. These multiple optical sensors can obtain somewhat different values of $\Delta t$ for the same object detected. This can be due to differences in detection planes or to the different areas of the faces of the foreign object facing each optical detector 24.

If an estimate of the size of the detected foreign object in the other two dimensions (those dimensions orthogonal to the longitudinal axis) is desired, the single-element backscatter photodetectors can be supplemented or even replaced by linear photodiode arrays covering the same 90-degree angular fields-of-view. Linear arrays of sixteen elements are commercially available. Each element in such an array will cover a planar angle of about 5.6 degrees (95 mrads). For foreign objects entering inlet 18 of aircraft engine 14 at a radial distance of approximately one meter from the optical detector/optical projector, this corresponds to a lateral spatial resolution of 95 mm (3.7 inches). This is coarse spatial resolution for estimating the size of FOD. Arrays with more elements are available. Cameras 32 can also be used to determine (or at least capture) the lateral dimensions of a foreign object detected.

Figure 4A:
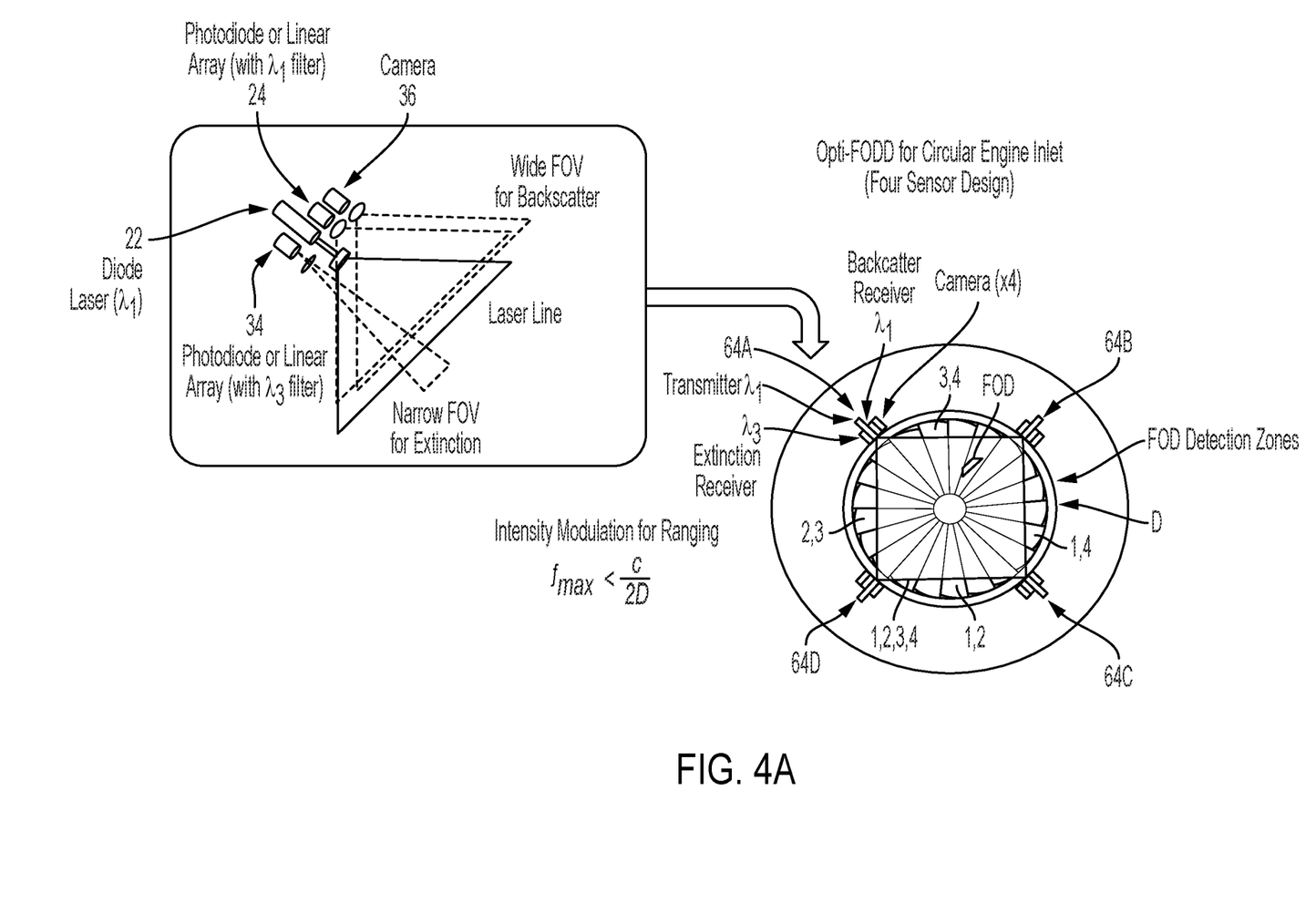
FIGS. 4A and 4B are schematic views of systems for detecting aircraft engine ingestion of foreign object debris having three and four groupings of optical projectors and detectors, respectively.
Figure 4B:
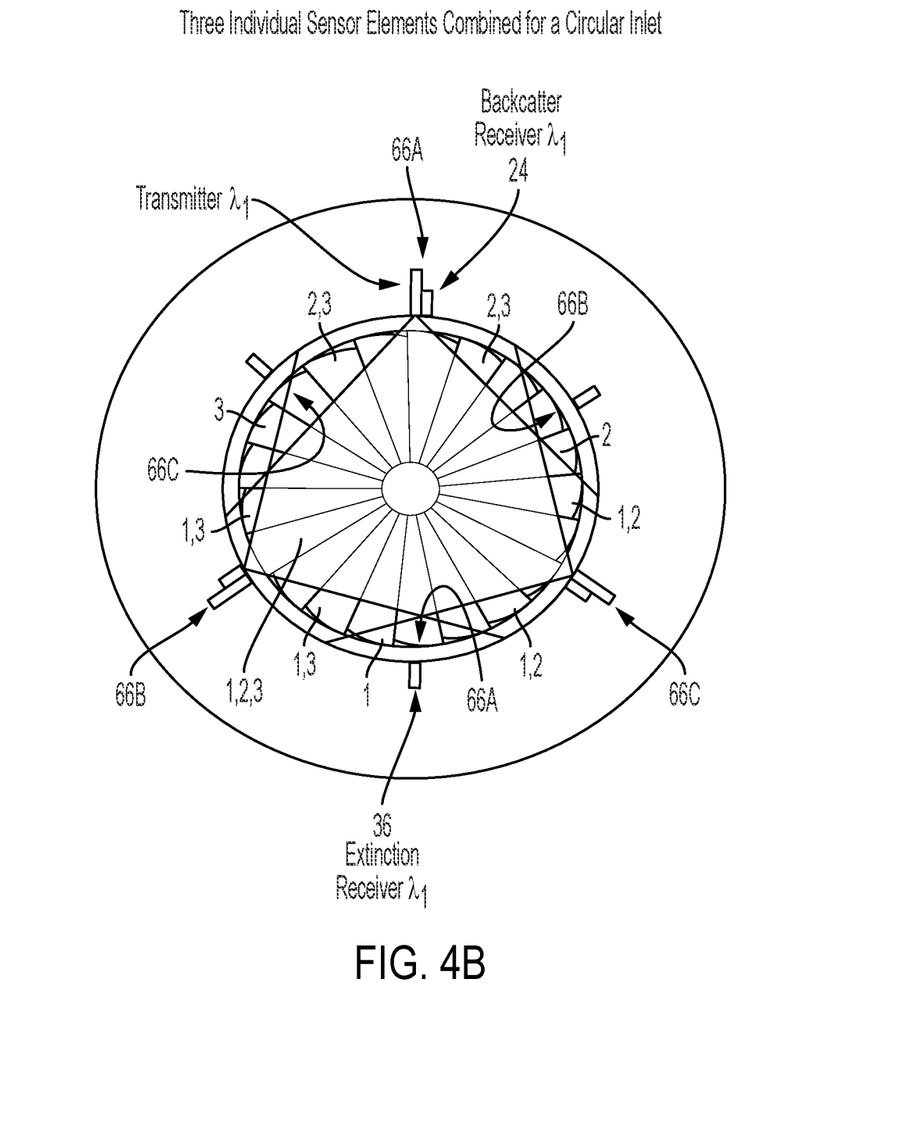

FIGS. 4A and 4B are schematic views of systems for detecting aircraft engine ingestion of foreign object debris having three and four groupings of optical projectors and detectors, respectively. In FIG. 4A, FOD detection system 20' has four groupings of components 64A, 64B, 64C, and 64D distributed about inlet cowl 16 of aircraft engine 14 at 90° intervals. Each of groupings 64A, 64B, 64C, and 64D include optical projector 22, optical detectors 24 and 34 and camera 36. Groupings 64A and 64C are mounted on opposite sides of inlet cowl 16 from one another, and groupings 64B and 64D are mounted on opposite sides of inlet cowl 16 from one another. In this configuration, optical detectors 34 of each of groupings 64A, 64B, 64C, and 64D are configured to detect unscattered or forward-scattered portions of the planar beam of light projected by optical projector of groupings 64A, 64B, 64C, and 64D, respectively, mounted opposite of optical detectors 34. Fields of view of optical detectors 34 can be small—just large enough to include optical projectors 22.

Optical projectors 22 and optical detectors 24 of each of groupings 64A, 64B, 64C, and 64D have projection and detection fields of view, respectively, that are substantially coextensive with one another. In some embodiments, the fields of view of optical projectors can be slightly canted in a longitudinal direction with respect to the fields of view of optical detectors 24 such that the intersection between corresponding optical projectors 22 and optical detectors 24 have a limited or maximum range. In other embodiments, the fields of view of optical projectors 22 and optical detectors 24 can be substantially coextensive. In such embodiments, range and location calculations can be used to discriminate between foreign objects within and without inlet 16 of aircraft engine 14.

Because optical detector 24 of component grouping 64A is aligned so as to detect an unscattered or forward-scattered portion of the beams of light projected from optical detectors 24 of component groupings 64B, 64C and 64D, methods can be used to discriminate or exclude such projected beams of light from detection by optical detector 24 of component grouping 64A. These same methods can be used for the other component groupings as well. For example, each of the component groupings can be tuned to a different frequency of light from the other groupings. Narrow band-pass filters, for example, can be employed for such a purpose. In some embodiments, the projected beams of light of the different groupings can be modulated at different modulation frequencies to provide for such discrimination. In some embodiments, the pulse timing of the projected beams of light can be sequenced through the component groupings so as to identify the source of each pulsed beam of light projected.

Signals generated by each of groupings 64A, 64B, 64C and 64D can be compared or used in combination to improve the metrics determined regarding foreign objects and/or the atmosphere ingested into aircraft engine 14. The relative magnitudes of the detected signals, for example, can be indicative of the relative size of the face of the object facing each of optical detectors 24 of groupings 64A, 64B, 64C and 64D. Furthermore, camera imagery taken from each of the vantage points of groupings 64A, 64B, 64C and 64D can capture any foreign objects ingested into aircraft engine 14. These images can provide date to calculate a volumetric size and orthogonal dimensions of any objects ingested.

In FIG. 4B, FOD detection system 20" has three sets of components 66A, 66B, and 66C distributed about inlet cowl 16 of aircraft engine 14 at 120° intervals. Each of groupings 66A, 66B, and 66C have two component groupings, a primary component grouping that includes optical projector 22, optical detector 24, and camera 36, and a secondary grouping that includes and 34. Each set 66A, 66B, and 66C have primary and secondary groupings mounted on opposite sides of inlet cowl 16 from one another. In this configuration, optical detectors 34 of each of sets 66A, 66B, and 66C are configured to detect unscattered or forward-scattered portions of the planar beam of light projected by optical projector 22 by optical detector 34 mounted opposite of optical projector 22. Fields of view of optical detectors 34 can be small—just large enough to include optical projectors 22.

Optical projectors 22 and optical detectors 24 of each of sets 66A, 66B, and 66C have projection and detection fields of view, respectively, that are substantially coextensive with one another. In some embodiments, the fields of view of optical projectors can be slightly canted in a longitudinal direction with respect to the fields of view of optical detectors 24 such that the intersection between corresponding optical projectors 22 and optical detectors 24 have a limited or maximum range. In other embodiments, the fields of view of optical projectors 22 and optical detectors 24 can be substantially coextensive. In such embodiments, range and location calculations can be used to discriminate between foreign objects within and without inlet 16 of aircraft engine 14.

Figure 5:
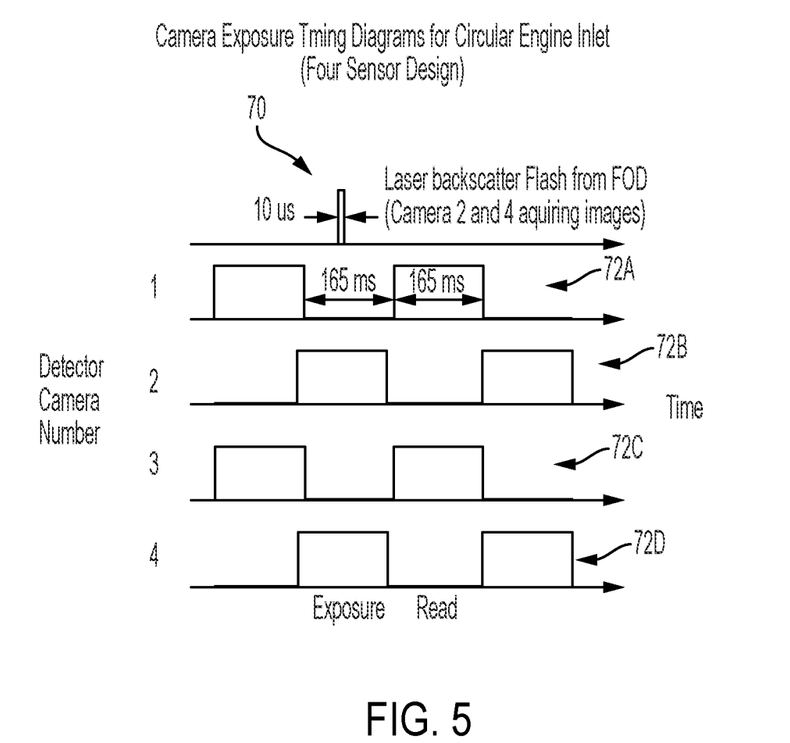
FIG. 5 is a timing diagram showing an example of the timing of various components of a FOD detection system.

FIG. 5 is a timing diagram showing an example of the timing of various components of a FOD detection system. In FIG. 5, graph 68 includes timing signals 70, 72A, 72B, 72C, and 72D. A horizontal axis of each of timing signals 70, 72A, 72B, 72C, and 72D represents time. Each of timing signals 70, 72A, 72B, 72C, and 72D are horizontally aligned with one another so as to indicate temporal coordination with one another. Timing signal 70 represents a signal generated by one of optical detectors 24. Timing signal 70 indicates detection of a foreign object by a pulse detected during a detection period $T_{A1}$. Timing signals 72A, 72B, 72C, and 72D correspond to shutter timing of cameras 36 of each of component groupings 64A, 64B, 64C, and 64D of the system depicted in FIG. 4A. Cameras 36 of component groupings 64A and 64C simultaneously capture images during shutter operations that have a fifty percent duty cycle. Cameras 36 of component groupings 64B and 64D simultaneously capture images during shutter operations that have a fifty percent duty cycle. Cameras 36 of component groupings 64A and 64C have shutters that permit image capture at times the cameras 36 of component groupings 64B and 64D are not capturing images. Conversely, cameras 36 of component groupings 64B and 64D have shutters that permit image capture at times the cameras 36 of component groupings 64A and 64C are not capturing images. In this fashion, two cameras are always capturing imagery so as to capture images whenever a foreign object intercepts the detection plane across inlet 18 of aircraft engine 14.

Various embodiments can include various types of cameras 36. For example, camera 36 can be a small CCD camera to capture images of any foreign objects either in addition to or as an alternative to using a photodiode array as optical detector 24. A 64 Mega-pixel camera commonly found in cell phones, for example, contains any array of 0.8 µm pixels in a 6016×3384 format producing a video stream at 33 frames per second. With a wide angle lenses covering a 90-degree field of view, the angular resolution per pixel in the horizontal direction is −0.26 mrad (0.015 degree). For detection of an object one meter away, that corresponds to a spatial resolution of 0.26 mm. The image of an object 2 mm wide, for example, would subtend nearly 8 pixels.

If the exposure time of such a camera can be set to 165 milliseconds, the image acquisition duty cycle can be 50% for each of cameras 36. With each of component groupings 64A, 64B, 64C, and 64D being equipped with cameras 36 covering projection and detection fields of view 36 and 38, complete coverage of a rectangular portion of inlet 18 can be obtained by all four of cameras 36, and the entire circular inlet 18 can be captured by at least two of cameras 36. When any foreign object passes through the detection plane, at least one cameras 36 is configured to record an image of such a foreign object. The video streams of the cameras do not require long-term storage in memory unless one or more of the photodiode sensors detects the presence of FOD. The last three or four frames of all of the cameras can be temporarily stored into a rolling memory buffer. This rolling memory buffer is continuously copied over unless a foreign object is detected by FOD detection system 20. If a foreign object is detected, the images stored in rolling memory can be retained in long term storage or used for immediate image analysis to determine one or more metrics of the foreign object.

Discussion of Possible Embodiments

The following are non-exclusive descriptions of possible embodiments of the present invention.

Apparatus and associated methods relate to a system for detecting foreign object debris ingested by an aircraft engine. The system includes an optical projector configured to project a beam of light across an inlet of the aircraft engine. The system includes an optical detector aligned with the optical projector so as to detect a back-scattered portion of the beam of light scattered by objects passing therethrough. The system includes a processor configured to determine whether foreign object debris enters the aircraft engine inlet based on a comparison of a threshold value with a signal indicative of the back-scattered portion generated by the optical detector.

The system of the preceding paragraph can optionally include, additionally and/or alternatively, any one or more of the following features, configurations and/or additional components:

A further embodiment of the foregoing system, wherein the processor can be further configured to calculate a dimension of the foreign object debris based on a time duration that the signal generated indicative of the back-scattered portion exceeds the threshold value.

A further embodiment of any of the foregoing systems, wherein the processor can be further configured to calculate a range from the optical projector and detector to the foreign object debris detected based on the back-scattered portion detected.

A further embodiment of any of the foregoing systems, wherein the optical projector can be further configured to modulate an amplitude of the light. The optical detector can be configured to detect amplitude modulations of the back-scattered portion. The processor can be further configured to calculate a range from the foreign object detected and the optical projector and detector based on a phase difference between the beam projected and the back-scattered portion detected.

A further embodiment of any of the foregoing systems, wherein the optical projector can be further configured to project a pulse of light. The processor can be further configured to calculate range from the foreign object detected and the optical projector and detector based on a time differences between the pulses of light projected and the back-scattered portions detected.

A further embodiment of any of the foregoing systems can further include a second optical detector aligned with the optical projector so as to unscattered or forward-scattered portions of the beam of light projected by the optical projector. The processor can be further configured to determine, based on the unscattered or forward-scattered portions detected, optical extinction corresponding to scatter by particles entering the aircraft engine.

A further embodiment of any of the foregoing systems, wherein the beam of light is a planar beam of light collimated in a direction parallel to a longitudinal axis of the aircraft engine and diverged directions perpendicular to the longitudinal axis.

A further embodiment of any of the foregoing systems can further include an optical camera configured to take images of the inlet of the aircraft engine. The controller can be configured to control, based on detection of foreign object debris, a shutter of the camera so as to capture the foreign object debris detected.

A further embodiment of any of the foregoing systems, wherein the beam of light projected across the inlet of the aircraft engine can be polarized in a first polarization state, and the optical detector can be configured to detect back-scattered light of both the first polarization state and a second polarization state orthogonal to the first polarization state.

A further embodiment of any of the foregoing systems, wherein the processor can be further configured to calculate, based on the detected back-scattered light of both the first polarization state and a second polarization state, metrics of an atmosphere ingested into the aircraft engine.

Some embodiments relate to a system for detecting foreign object debris ingested by an aircraft engine. The system includes a plurality of foreign object detectors distributed about an inlet of an aircraft engine. Each of the plurality of foreign object detectors includes an optical projector configured to project a beam of light across the inlet of the aircraft engine. Each of the plurality of foreign object detectors also includes an optical detector aligned with the optical projector so as to detect a back-scattered portion of the beam of light scattered by objects passing therethrough. The system includes a processor configured to determine whether foreign object debris enters the aircraft engine inlet based on a comparison of a threshold value with a signal indicative of the back-scattered portion generated by at least one of the plurality of optical detectors.

A further embodiment of the foregoing system, wherein the optical projector and the optical detector of a first one of the plurality of foreign object detectors projects and detects light of a first wavelength. The optical projector and the optical detector of a second one of the plurality of foreign object detectors, projects and detects light of a second wavelength different from the first wavelength.

A further embodiment of any of the foregoing systems, wherein the processor can be further configured to calculate a range from the foreign object debris detected to the first optical projector and detector based on a first back-scattered portion detected by the first optical detector. The processor can be further configured to calculate a range from the foreign object debris detected to the second optical projector and detector based on a second back-scattered portion detected by the first optical detector.

A further embodiment of any of the foregoing systems. wherein the processor is further configured to determine a location within the inlet where the foreign object debris entered based on the calculated first and second ranges.

Some embodiments relate to a method for detecting foreign object debris ingested by an aircraft engine. The method includes projecting, via an optical projector, a beam of light across an inlet of the aircraft engine. The method includes detecting, via an optical detector aligned with the optical projector, a back-scattered portion of the beam of light scattered by objects passing therethrough. The method also includes determining, via a processor, whether foreign object debris enters the aircraft engine inlet based on a comparison of a threshold value with a signal indicative of the back-scattered portion generated by the optical detector.

The method of the preceding paragraph can optionally include, additionally and/or alternatively, any one or more of the following features, configurations and/or additional components:

A further embodiment of the foregoing method can further include calculating, via the processor, metrics of an atmosphere ingested into the aircraft engine.

A further embodiment of any of the foregoing methods can further include calculating, via the processor, a dimension of the foreign object debris based on a time duration that the signal generated indicative of the back-scattered portion exceeds the threshold value.

A further embodiment of any of the foregoing methods can further include calculating, via the processor, a range from the optical projector and detector to the foreign object debris detected based on the back-scattered portion detected.

A further embodiment of any of the foregoing methods can further include modulating, via the optical projector, an amplitude of the light, wherein the optical detector is configured to detect amplitude modulations of the back-scattered portion. The method can also include calculating, via the processor, a range from the foreign object detected and the optical projector and detector based on a phase difference between the beam projected and the back-scattered portion detected.

A further embodiment of any of the foregoing methods can further include projecting, via the optical projector, a pulse of light. The method can also include calculating, via the processor, range from the foreign object detected and the optical projector and detector based on a time differences between the pulses of light projected and the back-scattered portions detected.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for detecting foreign object debris ingested by an aircraft engine, the system comprising:
   an optical projector configured to project a beam of light across an inlet of the aircraft engine, wherein the beam of light is a planar beam of light collimated in a direction parallel to a longitudinal axis of the aircraft engine and diverged in directions perpendicular to the longitudinal axis;
   an optical detector aligned with the optical projector so as to detect a back-scattered portion of the beam of light back-scattered by objects passing therethrough; and
   a processor configured to determine whether foreign object debris enters the aircraft engine inlet based on a comparison of a threshold value with a signal indicative of the back-scattered portion generated by the optical detector.

2. The system of claim 1, wherein the processor is further configured to calculate a dimension of the foreign object debris based on a time duration that the signal generated indicative of the back-scattered portion exceeds the threshold value.

3. The system of claim 1, wherein the processor is further configured to calculate a range from the optical projector and detector to the foreign object debris detected based on the back-scattered portion detected.

4. The system of claim 3, wherein the optical projector is further configured to modulate an amplitude of the light, wherein the optical detector is configured to detect amplitude modulations of the back-scattered portion, and wherein the processor is further configured to calculate a range from the foreign object detected and the optical projector and detector based on a phase difference between the beam projected and the back-scattered portion detected.

5. The system of claim 3, wherein the optical projector is further configured to project a pulse of light, wherein the processor is further configured to calculate range from the foreign object detected and the optical projector and detector based on a time differences between the pulses of light projected and the back-scattered portions detected.

6. The system of claim 1, further comprising:
   a second optical detector aligned with the optical projector so as to unscattered or forward-scattered portions of the beam of light projected by the optical projector, wherein the processor is further configured to determine, based on the unscattered or forward-scattered portions detected, optical extinction corresponding to scatter by particles entering the aircraft engine.

7. The system of claim 1, further comprising:
   an optical camera configured to take images of the inlet of the aircraft engine, wherein the controller is configured to control, based on detection of foreign object debris, a shutter of the camera so as to capture the foreign object debris detected.

8. The system of claim 1, wherein the beam of light projected across the inlet of the aircraft engine is polarized in a first polarization state, and the optical detector is configured to detect back-scattered light of both the first polarization state and a second polarization state orthogonal to the first polarization state.

9. The system of claim 8, wherein the processor is further configured to calculate, based on the detected back-scattered light of both the first polarization state and a second polarization state, metrics of an atmosphere ingested into the aircraft engine.

10. A system for detecting foreign object debris ingested by an aircraft engine, the system comprising:
    a plurality of foreign object detectors distributed about an inlet of an aircraft engine, each of the plurality of foreign object detectors comprising:
       an optical projector configured to project a beam of light across the inlet of the aircraft engine, wherein the beam of light is a planar beam of light collimated in a direction parallel to a longitudinal axis of the aircraft engine and diverged in directions perpendicular to the longitudinal axis; and
       an optical detector aligned with the optical projector so as to detect a back-scattered portion of the beam of light back-scattered by objects passing therethrough; and
    a processor configured to determine whether foreign object debris enters the aircraft engine inlet based on a comparison of a threshold value with a signal indicative of the back-scattered portion generated by at least one of the plurality of optical detectors.

11. The system of claim 10, wherein the optical projector and the optical detector of a first one of the plurality of foreign object detectors projects and detects light of a first wavelength, wherein the optical projector and the optical detector of a second one of the plurality of foreign object detectors, projects and detects light of a second wavelength different from the first wavelength.

12. The system of claim 10, wherein the processor is further configured to calculate a range from the foreign object debris detected to the first optical projector and detector based on a first back-scattered portion detected by the first optical detector, wherein the processor is further configured to calculate a range from the foreign object debris detected to the second optical projector and detector based on a second back-scattered portion detected by the first optical detector.

13. The system of claim 12, wherein the processor is further configured to determine a location within the inlet where the foreign object debris entered based on the calculated first and second ranges.

14. A method for detecting foreign object debris ingested by an aircraft engine, the method comprising:
    projecting, via an optical projector, a beam of light across an inlet of the aircraft engine, wherein the beam of light is a planar beam of light collimated in a direction parallel to a longitudinal axis of the aircraft engine and diverged in directions perpendicular to the longitudinal axis;
    detecting, via an optical detector aligned with the optical projector, a back-scattered portion of the beam of light back-scattered by objects passing therethrough; and determining, via a processor, whether foreign object debris enters the aircraft engine inlet based on a comparison of a threshold value with a signal indicative of the back-scattered portion generated by the optical detector.

15. The method of claim 14, further comprising:
calculating, via the processor, metrics of an atmosphere ingested into the aircraft engine.

16. The method of claim 14, further comprising:
calculating, via the processor, a dimension of the foreign object debris based on a time duration that the signal generated indicative of the back-scattered portion exceeds the threshold value.

17. The method of claim 14, further comprising:
calculating, via the processor, a range from the optical projector and detector to the foreign object debris detected based on the back-scattered portion detected.

18. The method of claim 17, further comprising:
modulating, via the optical projector, an amplitude of the light, wherein the optical detector is configured to detect amplitude modulations of the back-scattered portion; and
calculating, via the processor, a range from the foreign object detected and the optical projector and detector based on a phase difference between the beam projected and the back-scattered portion detected.

19. The method of claim 17, further comprising:
projecting, via the optical projector, a pulse of light; and
calculating, via the processor, range from the foreign object detected and the optical projector and detector based on a time differences between the pulses of light projected and the back-scattered portions detected.

* * * * *